United States Patent [19]

Verzwyvelt

[11] 4,363,834
[45] Dec. 14, 1982

[54] PROCESS FOR PREPARING WETTABLE COMPOSITES FROM INERT ORGANIC POLYMER FIBERS WITH INORGANIC PARTICLES

[75] Inventor: Scott A. Verzwyvelt, Newbury Park, Calif.

[73] Assignee: Hughes Aircraft Company, Culver City, Calif.

[21] Appl. No.: 280,415

[22] Filed: Jul. 6, 1981

Related U.S. Application Data

[62] Division of Ser. No. 128,747, Mar. 10, 1980, Pat. No. 4,277,547.

[51] Int. Cl.$^3$ ............................ B05D 3/00; B05D 3/02
[52] U.S. Cl. .................................. 427/296; 427/372.2; 427/121
[58] Field of Search ........................... 429/250, 1, 254; 427/294, 296, 372.2

[56] References Cited

U.S. PATENT DOCUMENTS

| | | | |
|---|---|---|---|
| 3,647,554 | 3/1972 | Arrance et al. | 429/251 X |
| 3,695,937 | 10/1972 | Rowlette | 429/251 X |
| 3,880,672 | 4/1975 | Megahed et al. | 429/251 X |
| 4,034,144 | 7/1977 | Chireau | 429/251 X |
| 4,287,276 | 9/1981 | Lundquist et al. | 429/254 X |

Primary Examiner—Michael R. Lusignan
Attorney, Agent, or Firm—A. W. Karambelas; W. H. MacAllister

[57] ABSTRACT

Substrates prepared from chemically inert organic fibers that are non-wettable are rendered wettable by mechanically attached coatings of hydrophilic inorganic particles. The resulting inorganic-organic composites are suitable for use as separators in alkaline storage cells.

3 Claims, No Drawings

PROCESS FOR PREPARING WETTABLE
COMPOSITES FROM INERT ORGANIC
POLYMER FIBERS WITH INORGANIC
PARTICLES

This is a division of application Ser. No. 128,747, filed Mar. 10, 1980, now U.S. Pat. No. 4,277,547, patented July 7, 1981.

TECHNICAL FIELD

This invention relates generally to the preparation of inorganic-organic composites and more particularly to the preparation of porous wettable composites for use as separators in alkaline storage cells.

CROSS-REFERENCE TO RELATED APPLICATIONS

U.S. application Ser. No. 948,119, filed Oct. 2, 1978 by Hong Sup Lim, Howard H. Rogers, and Applicant for a New Process for Reinforcing Structually Fragile Inorganic Fabrics which issued as U.S. Pat. No. 4,233,347, on Nov. 11, 1980, discloses a process for reinforcing structually fragile inorganic fabrics whereby reinforcing polymers are precipatated from polymer solvent solutions into the interstices of porous inorganic fabrics.

U.S. application Ser. No. 953,511, filed Oct. 23, 1978 by Applicant herein for An Improved Polypropylene Separator for use in Alkaline Storage Batteries and Process for Making the same which issued as U.S. Pat. No. 4,217,404 on Aug. 12, 1980, discloses a method a rendering intrinsically non-wettable polypropylene separators wettable by treating them with compounds such as polybenzimidazole.

U.S. application Ser. No. 953,523, filed Oct. 23, 1978 by Hong Sup Lim and applicant herein, which issued as U.S. Pat. No. 4,269,913 on May 26, 1981 discloses novel inorganic composite felts suitable for use in alkaline storage cells and the process for making the same.

U.S. application Ser. No. 135,608, filed Feb. 1980 by Applicant herein now issued as U.S. Pat. No. 4,308,325 for A Technique For Reinforcing Inorganic Fabrics with Fluoroplastics, now U.S. Pat. No. 4,308,325, patented Dec. 29, 1981, discloses a process for reinforcing inorganic fabrics with fluoroplastics which yields composites having similiar properties to that of the composites disclosed below.

Each of the above mentioned copending applications are commonly assigned to Hughes Aircraft Company the assignee herein.

BACKGROUND OF THE INVENTION

1. Field of the Invention

This invention provides an improved separator for alkaline storage batteries intended for use in spacecraft applications. Separators intended for use in alkaline storage batteries for spacecraft power systems must frequently operate in an electrolyte starved condition, must be gas permeable, must exhibit good mechanical strength and must be chemically and thermally stable. Composites are employed in the fabrication of separators because of their potential for achieving an optimum set of operating charactersitics such as those set forth above. Therefore, this invention describes an optimum composite and the process for making it from known materials.

2. Description of the Prior Art

There are many approaches to the solution of the problem of preparing composite separators for use in alkaline storage cells. Typical examples of these approaches are disclosed in: the teachings of A. Langer et al in U.S. Pat. No. 3,749,604 for Heat Resistant Substrates and Batteries Separators Made therefrom; the teachings of Frank C. Arrance in U.S. Pat. No. 3,861,963 for Battery Separator Construction; the teachings of Nigel I. Palmer in U.S. Pat. No. 3,933,525 for Battery Separator Manufacturing Process; the teachings of Joseph A. Cogliano in U.S. Pat. No. 4,110,143 for Process for Making a Wettable Polypropylene Battery Separator; and the teachings of Phillip Bersting in U.S. Pat. No. 4,122,133, for Material for an Alkaline Cell Separator and Process of Making.

Many of the above mentioned teachings have yielded separators which meet with a measure of success. However, this art has not totally satisfied the requirements for alkaline storage cells to be used in certain spacecraft applications. Generally, the separators of the prior art are either non-wettable, chemically unstable, thermally unstable or gas impermeable, or a combination of the latter.

As far as it is known to Applicant, the closest prior art to the present invention is that disclosed in Applicant's copending application Ser. No. 948,119 identified above. In application Ser. No. 948,119, Applicant and his Coinventors described a process for reinforcing structually fragile inorganic fabrics with organic polymers. This approach was taken in order to utilize the electrolytic retention and wettability characteristics of inorganic fabrics which, in and of themselves, were unsuitable for use as separators in alkaline storage cells. The fabric reinforcing technique described in Application Ser. No. 948,119, has as its major limitation the ability to apply sufficient reinforcing material to the inorganic fabric to achieve the strength objectives without losing the wettability characteristics of the inorganic material.

While each of the separators prepared in accordance with the teachings of the above prior art can be classified as composites prepared from individually old materials, these separators contain certain structural and/or material distinctions which tend to limit their utility for spacecraft applications. Therefore, there is a need for a composite separator material which exhibits all of the above stated desirable characteristics and none of the disadvantages of the prior art separators.

SUMMARY OF THE INVENTION

The general objective of this invention is to provide an improved separator for use in the fabrication of alkaline storage cells for spacecraft power systems applications. In accomplishing this objective while avoiding most, if not all, of the disadvantages of the prior art and at the same time retaining the advantages of said art, I have invented a new process for preparing improved separators that are fabricated from chemically inert organic fibrous felts that have been provided with a granular coating of porous inorganic particles.

The separators of my invention are a new class of inorganic-organic composites wherein the major constituent is an inert organic fiber felt substrate. Electrolyte retention and wettability characteristics are imparted to these composites by porous hydrophyllic inorganic particles partially embedded into the surfaces of the organic fibers which form the felt substrate.

I prepare these materials by applying a particulate coating of inorganic particles to the surfaces of the fibers which form a woven fabric substrate. The particulate coated substrate is then controllably heated until it begins to soften whereby inorganic particles become partially embedded in the surfaces and permantly attached thereto.

It is therefore an objective of this invention to provide a separator for use in alkaline storage cells that is wettable in aqueous electrolyte solutions while being chemically stable in said solutions.

A further objective of this invention is to provide a porous separator that will retain aqueous alkaline electrolyte solutions.

A final and important objective of this invention is to provide a mechanically strong separator that is light in weight.

That I have accomplished these objectives and more will be apparent upon reference to the following detail description of the invention.

DETAILED DESCRIPTION OF THE INVENTION

This invention is embodied in a method by which inert polymer fabrics are made wettable to aqueous liquids by permenantly coating them with particulate hydrophilic inorganic materials. Polypropylene, polyethylene and fluoroplastics such as tetrafluoroethylene (TFE), chlorotrifluoroethylene, polyvinylfluoride, polyvinylidene fluoride and fluorinated ethylene propylene are all chemically inert to and intrinsically non-wettable to aqueous alkaline electrolytes. Inert inorganic particles such as zirconium oxide, potassium titanate and potassium oxide are hydrophilic and are chemically stable in the presence of aqueous alkaline electrolytic solutions. The permanent mechanical attachments of such inorganic particles to the surface of polymer strands, selected from the group of polymers identified above, yields a material that is readily wettable, has good electrolyte retention, and good electrical resistivity characteristics in the alkaline electrolytes of nickel cadmium and nickel-hydrogen batteries.

The wettability and retention of electrolyte is due to the porosity and hydrophillic nature of the inorganic particles. Good electrical resistivity characteristics are obtained by the proper distribution of the inorganic particles of the separator materials. The distance between said particles must be small enough to allow for surface tension bridging of electrolytes between said particles. This electrolyte bridging allows for ionic conductivity through the normally non-wettable polymer substrate. If the wrong inorganic particle size is chosen, or the polymer substrate is too heavily loaded, the pore structure inherent of the polymer substrate is lost, thereby reducing the gas permeability characteristics of the product.

The technique for mechnically attaching the inorganic materials to the organic substrate material is as follows: a suspension of inorganic particles can be made by chopping or grinding the particles and suspending them in a liquid such as water or other volatile solvent. There are also commerically available products such as Zircar Corporation's Rigidizer which appears suitable for use as the inorganic portion of this invention. Substrates are formed from inert organic fibers which form a fabric like matrix characterized by a multiplicity of entangled fibers whose surfaces are separated by interstices, which provide for the flow of gases. The substrates are washed and dried to remove any surface contaminants and then vacuum backfilled with the particle suspension. Excess liquid is blotted off in a controlled manner, and the remainder of the liquid is evaporated off in low temperature air or vacuum ovens.

The resulting polymer-metal oxide particle coated sample is heated in a high precision low thermal inertia oven until the particles are absorbed onto the surface of the organic fibers comprising the substrate. A gas chromatographic programmable air oven has been used for this purpose.

Alternatively, the organic substrate may be immersed in a container containing inorganic powders taken from one of the above stated materials which has been chopped or ground to a fine consistency. The polymer substrates is immersed in a container of such particles and agitated to assure thorough dispersion of the inorganic particles throughout the polymer substrates. The container of inorganic particles and the polymer substrate is then heated as a unit to permanently affixed the particles to the fiber surface of the polymer substrate.

This heating is the most critical step of fabrication. The polymer must be heated just to soften the polymer fibers allowing cementing or adsorption of the inorganic particles to the polymer fiber surfaces. If the polymer is not heated high enough, mechanical attachment is not obtained and the particles wash off in water. In turn, if the polymer is overheated, it will melt and the porous structure of the substrate will be lost when the fibers fuse.

The temperature profile required for attachment of the inorganic wetting agents to the polymer is dependent upon the type of polymer, the rheological characteristics of that particlar batch of polymer, the surface to volume ratio of the polymer fibers, the thermal history of the polymer substrates, the structural form and mass of the polymer substrate and the structural form, mass and type of the inorganic materials. The approximate final temperature of the temperature profile is determined, for a specific substrate, by differential scanning calorimetry. The initial change in slope due to the melting endotherm of the polymer is taken as the approximate final temperature. The exact determination of the final temperature, time at this temperature and rate at which the oven is heated to this temperature is determined experimentally.

Composites fabricated from polypropylene felts and zirconium oxide as well as TFE porous membranes and zirconium oxide exhibit good wettability, good electrolyte retention, high ionic conductivity in the electrolyte wet state, good mechanical strength, good gas permeability, and are chemically stable. It is possible to fabricate materials from inert organic polymers and inert inorganic wetting agents which demonstrate high potentials as battery separators in Ni-Cd and Ni-$H_2$ batteries. This invention may be practiced in accordance with the following examples.

EXAMPLE I

A polypropylene felt (sold by GAF Corporation under the code number WEX1242) was washed in acetone to remove all contaminants from the surfaces of the fibers contained therein (These felts may also be cleaned by immersing them in boiling water). An aqueous suspension of zirconium fibers (sold by Zircar Corporation of New York under the trade name ZYBF-2) was prepared by chopping an equal weight of fibers in water with a Waring Blender at low speed for 30 seconds.

The cleaned felt was placed in a bell jar, adapted for evacuation and use in a back filling operation, where the chopped zirconium oxide fiber suspension was allowed to flow into the jar thereby jack filling the felt substrate and interstices of the substrate to form a zirconium oxide particle-liquid soaked felt.

This felt was removed from the jar, allowed to drain and subsequently blotted to remove excess liquid. It was then placed in a vacuum oven at 75° C. where the remaining liquid was removed, leaving zirconium particles evenly dispersed about the surfaces of the felt fibers.

The particle covered felt was then placed in a precision gas chromatograph air oven with electronic programming capabilities (Hewlett-Packard Model HP Mode 5730A) and the temperature was raised to 160° C. at a rate of 16° C./minute where it was held for 10 minutes and rapidly cooled to ambient. That dried zirconium particles were firmly embedded into the surface of the fibers became evident when the cooled sample was placed in a container of water and subjected to ultrasonic vibrations.

EXAMPLE II

A tetrafluoroethylene (TFE) porous membrane (sold by Chemplast Inc. of Wayne N. York under the trade name Zitex K1064-122D) was washed and dried as described in Example I.

This membrane was then placed in a bell jar and back filled with a commercially available aqueous suspension of zirconium oxide particles obtained from Zircar Products Inc., called "Zirconia Rigidizer".

After back filling, the TFE membrane was drained, blotted and dried as in Example I and subsequently heated from ambient temperature to 330° C. at a rate of 32° C. per minute where it was held for two minutes before it was rapidly cooled.

The resulting product was mechanically strong and wettable in a 31% KOH solution.

EXAMPLE III

A polypropylene felt identical to that described in Example I was pretreated as in Example I with acetone to remove surface contamination. It was then immersed in a container filled with zirconium oxide fibers that were previously ground into a powder with a mortar and pistle.

The entire container was then placed in an HP Model 5730A oven and heated to 160° at 8° C./min and held at that temperature for 14 minutes.

INDUSTRIAL APPLICABILITY

Materials prepared in accordance with this invention may be utilized as separators in the fabrication of alkaline storage cells for spacecraft applications and for other applications requiring a strong, gas permeable, separator that is wettable in aqueous alkaline electrolyte solutions. These materials are particularly useful for Ni-H$_2$ and Ni-Cd storage cells.

Having disclosed my invention and provided teachings to enable others to make and utilize the same, the scope of may claims may now be understood as follows.

What is claimed is:

1. A method of permanently providing a granular coating of inert inorganic particles onto the surface of chemically inert fibers which form a gas permeable felt whereby said felt will be wettable in aqueous solutions comprising the steps of:
   (a) first providing a porous organic felt containing fibers whose surfaces are free of contamination;
   (b) applying a uniform coating of inert inorganic particles to the surface of said felt and throughout the interstices of said fibers by vacuum back-filling said felt with a suspension of porous inorganic particles in a carrier fluid; and
   (c) heating said particle-coated felt to a temperature slightly less than the melting point of said fibers whereby said fibers will soften and absorb said particles to the said surface thereby providing a permanently attached granular inorganic particle-coated fibrous felt.

2. A process in accordance with claim 1 wherein said fibers are selected from the group consisting of tetrafluoroethylene, fluorinated ethylene propylene, chlorotrifluoroethylene, polyvinyl fluoride, polyvinylidene fluoride, polyethylene, and polypropylene.

3. A process in accordance with claim 1 wherein said fibers are polypropylene.

* * * * *